(12) United States Patent
Moghe et al.

(10) Patent No.: US 10,507,737 B2
(45) Date of Patent: Dec. 17, 2019

(54) GAP CONTROL FOR VEHICLE WIRELESS POWER TRANSFER (WPT)

(71) Applicant: Cisco Technology, Inc., San Jose, CA (US)

(72) Inventors: Ashok Krishnaji Moghe, Pleasanton, CA (US); John George Apostolopoulos, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 113 days.

(21) Appl. No.: 15/793,197

(22) Filed: Oct. 25, 2017

(65) Prior Publication Data
US 2019/0039471 A1    Feb. 7, 2019

Related U.S. Application Data

(60) Provisional application No. 62/541,817, filed on Aug. 7, 2017.

(51) Int. Cl.
*H02J 50/80* (2016.01)
*H02J 50/10* (2016.01)
(Continued)

(52) U.S. Cl.
CPC ............. *B60L 53/38* (2019.02); *H02J 7/025* (2013.01); *H02J 50/10* (2016.02); *H02J 50/80* (2016.02); *H02J 50/90* (2016.02)

(58) Field of Classification Search
CPC .. H02J 50/80; H02J 50/90; H02J 50/10; H02J 7/025; B60L 11/1829; B60L 53/38
(Continued)

(56) References Cited

U.S. PATENT DOCUMENTS

| | | | |
|---|---|---|---|
| 6,421,600 B1* | 7/2002 | Ross | B60L 5/005 701/117 |
| 10,325,717 B2* | 6/2019 | Boys | H01F 38/14 |

(Continued)

OTHER PUBLICATIONS

Fan et al., "Safe Wireless Power Transfer to Moving Vehicles: Design of Radiationless Antenna", https://gcep.stanford.edu/pdfs/TechReports2013/5.5_Fan_Public_Version_2013.pdf, 2013, 7 pages. (Year: 2013).*

(Continued)

*Primary Examiner* — Phallaka Kik
(74) *Attorney, Agent, or Firm* — Behmke Innovation Group LLC; James Behmke; Stephen D. LeBarron

(57) ABSTRACT

In one embodiment, a device in a wireless power transfer (WPT) system receives data regarding a vehicle equipped with a vehicle-based charging coil configured to receive electrical power transferred from a ground-based charging coil of the WPT system. The device determines, based on the received data, a time at which the vehicle-based charging coil is expected to be in charging proximity of the ground-based coil. Based on the received data, the device determines a gap distance between the vehicle-based charging coil and the ground-based charging coil to optimize the transfer of electrical power from the ground-based charging coil to the vehicle-based charging coil when the coils are in charging proximity of one another. The device sends control instructions to an adjustment system to implement the identified gap distance in advance of the determined time by adjusting a height of the vehicle-based charging coil or the ground-based charging coil.

20 Claims, 11 Drawing Sheets

(51) Int. Cl.
*H02J 50/90* (2016.01)
*H02J 7/00* (2006.01)
*B60L 53/38* (2019.01)
*B60L 11/00* (2006.01)
*H02J 7/02* (2016.01)

(58) Field of Classification Search
USPC .................................... 320/109, 108, 104
See application file for complete search history.

(56) References Cited

U.S. PATENT DOCUMENTS

| | | | | |
|---|---|---|---|---|
| 10,340,743 B2* | 7/2019 | Takatsu | ............... | H02J 50/12 |
| 2011/0018498 A1* | 1/2011 | Soar | ............... | H01F 27/365 |
| | | | | 320/108 |
| 2011/0316553 A1* | 12/2011 | Taguchi | ............... | B60L 3/00 |
| | | | | 324/500 |
| 2012/0217111 A1* | 8/2012 | Boys | ............... | H01F 38/14 |
| | | | | 191/10 |
| 2013/0005251 A1* | 1/2013 | Soar | ............... | H02J 7/025 |
| | | | | 455/41.1 |
| 2014/0239729 A1* | 8/2014 | Covic | ............... | H02J 17/00 |
| | | | | 307/104 |
| 2014/0340031 A1* | 11/2014 | Mi | ............... | H04B 5/0037 |
| | | | | 320/108 |
| 2015/0303701 A1* | 10/2015 | Terao | ............... | G01S 17/87 |
| | | | | 307/104 |
| 2017/0194817 A1* | 7/2017 | Takatsu | ............... | H02J 50/12 |
| 2017/0282733 A1* | 10/2017 | Ito | ............... | B60L 11/1829 |
| 2017/0368948 A1* | 12/2017 | Kume | ............... | H02J 50/90 |
| 2018/0287416 A1* | 10/2018 | Saita | ............... | H02J 7/025 |

OTHER PUBLICATIONS

Hagemeyer, "Wireless energy transmission and efficiency: A contradiction?" Energy for Life, Nov. 26, 2015, pp. 2-9. (Year: 2015).*

Valtchev et al., "Electromagnetic Field as the Wireless Transporter of Energy", Facta Universitatis, Ser: Elec. Energ. vol. 25, No. 3, Dec. 2012, pp. 171-181. (Year: 2012).*

Feliziani, et al., "Robust LCC Compensation in Wireless Power Transfer with Variable Coupling Factor Due to Coil Misalignment", 2015 IEEE 15th International Conference on Environment and Electrical Engineering (EEEIC), 6 pages, 2015, IEEE.

Hwang, et al., "An Autonomous Coil Alignment System for the Dynamic Wireless Charging of Electric Vehicles to Minimize Lateral Misalignment", Energies 2017, 10, 315; doi:10.3390/en10030315, http://www.mdpi.com/journal/energies, 2017, 20 pages, MDPI.

Hwang, et al., "Autonomous Coil Alignment System Using Fuzzy Steering Control for Electric Vehicles with Dynamic Wireless Charging", Mathematical Problems in Engineering, vol. 2015 (2015), Article ID 205285, https://www.hindawi.com/journals/mpe/2015/205285/, 14 pages, Hindawi.

Vaka, et al., "Review on Contactless Power Transfer for Electric Vehicle Charging", Energies 2017, 10, 636; doi:10.3390/en10050636, http://www.mdpi.com/journal/energies, 2017, 20 pages, MDPI.

"Halo", https://www.qualcomm.com/products/halo/features, 3 pages, Accessed Aug. 29, 2017, Qualcomm.

"Height adjustable suspension", https://en.wikipedia.org/wiki/Height_adjustable_suspension, 2 pages, Jul. 22, 2017, Wikimedia Foundation, Inc.

* cited by examiner

GAP CONTROL FOR VEHICLE WIRELESS POWER TRANSFER (WPT)

RELATED APPLICATION

This application claims priority to U.S. Provisional Patent Appl. No. 62/541,817, filed on Aug. 7, 2017, entitled "GAP CONTROL FOR VEHICLE WIRELESS POWER TRANSFER (WPT)," by Moghe, et al., the contents of which are incorporated herein by reference.

TECHNICAL FIELD

The present disclosure relates generally to computer networks, and, more particularly, to gap control for vehicle wireless power transfer (WPT) systems.

BACKGROUND

Wireless power transfer (WPT) has proven to be viable for charging electric vehicles (EVs). In a typical WPT setup for EVs, a ground-based coil is supplied power, thereby inducing a current remotely in a second, vehicle-based coil located at the bottom of the EV. However, the alignment and air gap between the ground-based coil and the vehicle-based coil greatly affects the efficiency of power transfer. Various vehicle conditions can affect the gap between the coils including, but not limited to: 1.) the number of passengers or amount of load in the vehicle, which can cause it to sag unevenly, 2.) uneven tire inflation, 3.) uneven wear and tear of tires, 4.) uneven wear and tear of shocks and struts of the vehicle, 5.) misaligned charging coils, as well as other potential factors.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
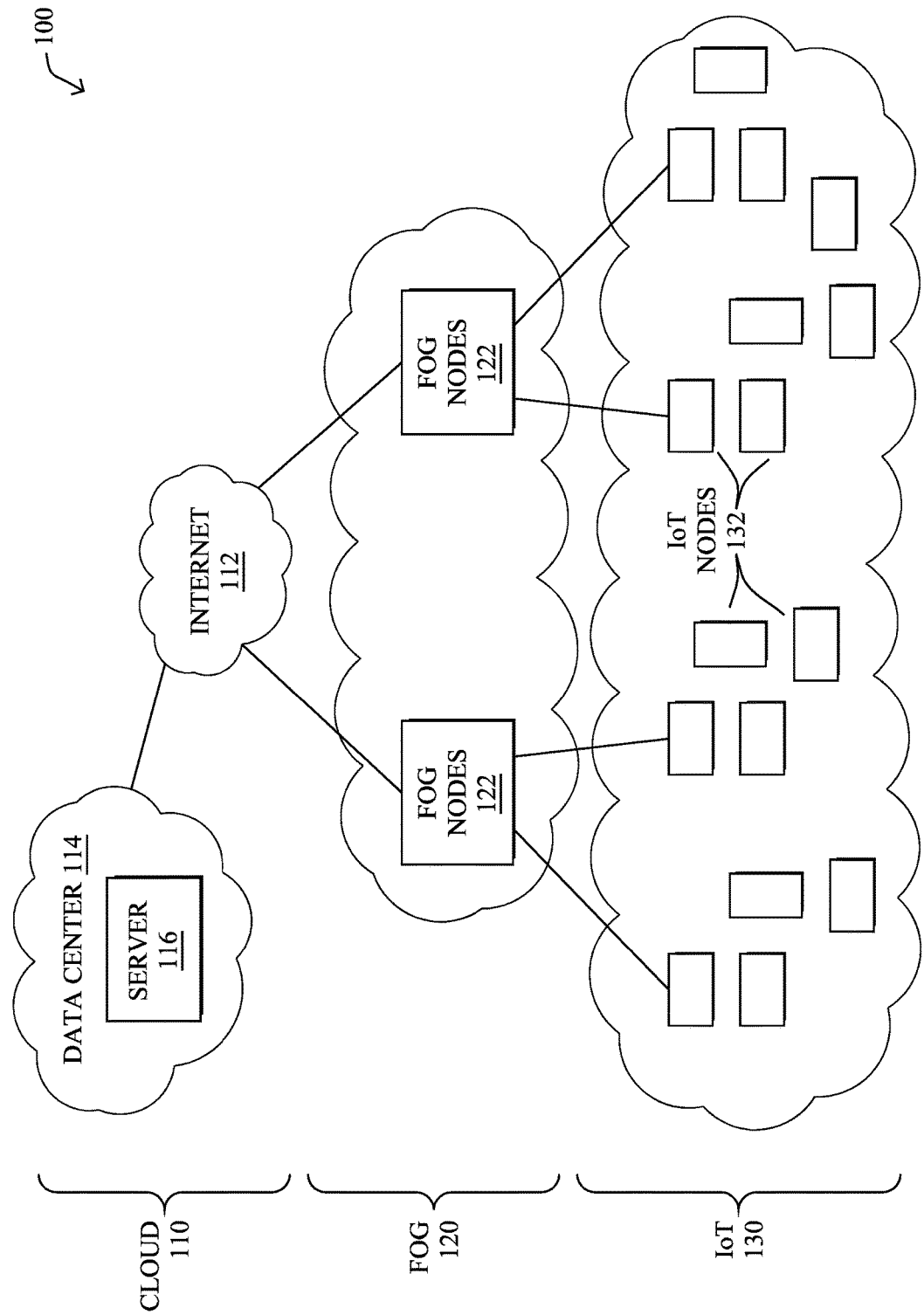
FIGS. 1A-1B illustrate an example communication network.

According to one or more embodiments of the disclosure, a device in a wireless power transfer (WPT) system receives data regarding a vehicle equipped with a vehicle-based charging coil configured to receive electrical power transferred from a ground-based charging coil of the WPT system. The device determines, based on the received data, a time at which the vehicle-based charging coil is expected to be in charging proximity of the ground-based coil. Based on the received data, the device determines a gap distance between the vehicle-based charging coil and the ground-based charging coil to optimize the transfer of electrical power from the ground-based charging coil to the vehicle-based charging coil when the coils are in charging proximity of one another. The device sends control instructions to an adjustment system to implement the identified gap distance in advance of the determined time by adjusting a height of the vehicle-based charging coil or the ground-based charging coil.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh network, such as wireless or PLC networks, etc., and are often on what is referred to as Low-Power and Lossy Networks (LLNs), which are a class of networks in which both the routers and their interconnects are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1A is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 1B:
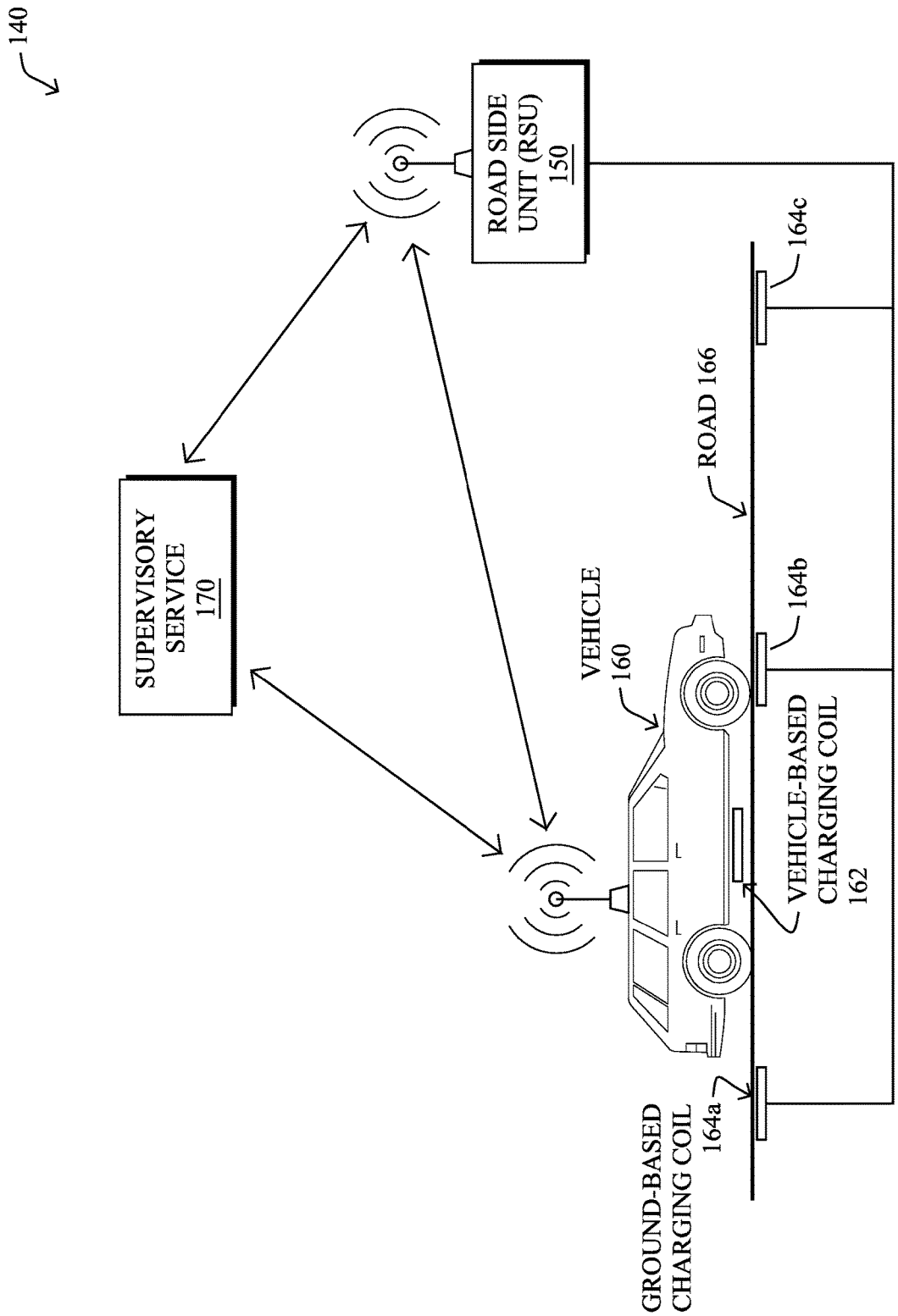

FIG. 1B illustrates an example wireless power transfer (WPT) system 140, according to various embodiments. In particular, WPT system 140 may include any or all of the following components: a vehicle 160, a roadside unit (RSU) 150, one or more ground-based charging coils 164, and/or a remote supervisory service 170. During operation, WPT system 140 may be operable to provide electrical charge to a local battery of vehicle 160, which may itself be an electric vehicle (e.g., either a fully-electric or hybrid electric vehicle).

In some embodiments, WPT system 140 may be a specific implementation of communication network 100. Notably, supervisory service 170 may be implemented at the cloud layer 110, such as at a particular server 116 in a data center 114 or, alternatively, across multiple servers 116, such as part of a cloud-based service. Similarly, RSU 150 may be a fog node 122 at fog computing layer 120, while vehicle 160 may be viewed as an IoT node 132 at IoT layer 130. Thus, vehicle 160 may communicate directly with RSU 150, and/or via other IoT nodes 132 (e.g., other vehicles, etc.), and RSU 150 may provide some degree of processing over the communicated data.

RSU 150 may communicate with supervisory service 170 via a WAN, such as the Internet 112 or another WAN. For example, RSU 150 may communicate with supervisory service 170 by leveraging a hardwired network connection, cellular or other wireless connection, satellite connection, or the like. Communications between vehicle 160 and RSU 150 may generally be wireless and use any form of known wireless communication (e.g., Wi-Fi, cellular, light-based, etc.).

As would be appreciated, vehicle 160 may comprise its own local network, to allow the various components of vehicle 160 to communicate with one another. For example, vehicle 160 may comprise a controller area network (CAN) bus, IP network, or the like, to allow the various systems of vehicle 160 to communicate with one another. Such system may include, but are not limited to, an engine control unit (ECU), a battery management system (BMS) that manages the local battery of vehicle 160, and the like. A local gateway of vehicle 160 may provide communicative connectivity between the local network of vehicle 160 and other devices. For example, the local gateway of vehicle 160 may provide wireless connectivity to RCU 150 located along road 166 on which vehicle 160 is traveling. In some embodiments, vehicle 160 may also communicate directly with supervisory service 170 via the Internet 112 or another WAN, such as by leveraging a wireless connection to a cellular or satellite-based network.

In various embodiments, vehicle 160 may comprise one or more vehicle-based charging coils 162 that are electronically coupled to the battery of vehicle 160. In addition, as shown, any number of ground-based charging coils 164 may be located along road 166, such as embedded into road 166. For example, ground-based charging coils 164a-164c may be embedded into road 166 and wired to RSU 150 that provides control over the powering of ground-based charging coils 164. For purposes of clarification, the term "ground-based charging coil" generally refers to the location of the charging coil (e.g., embedded into the ground) and is not intended to imply that a coil 164 acts an electrical ground. Also note that a ground-based coil is also sometimes referred to as a "primary coil" or "grid side coil."

During operation, ground-based charging coils 164 may be powered/energized, to charge the battery of vehicle 160. Notably, when vehicle-based charging coil 162 is located within proximity of a given ground-based charging coil 164, the powered coil 164 may inductively couple with vehicle-based charging coil 162. As a result, a current will be induced in vehicle-based charging coil 164, which can be used to restore charge to the battery of vehicle 160. Such charging may be performed when vehicle 160 is stationary or in motion, depending on the implementation. In addition, while ground-based charging coils 164 are shown as embedded into road 166, other implementations provide for coils 164 to be embedded into, or placed on, a parking lot, drive-thru, driveway, or any other location at which vehicle 160 may be located.

Figure 2:
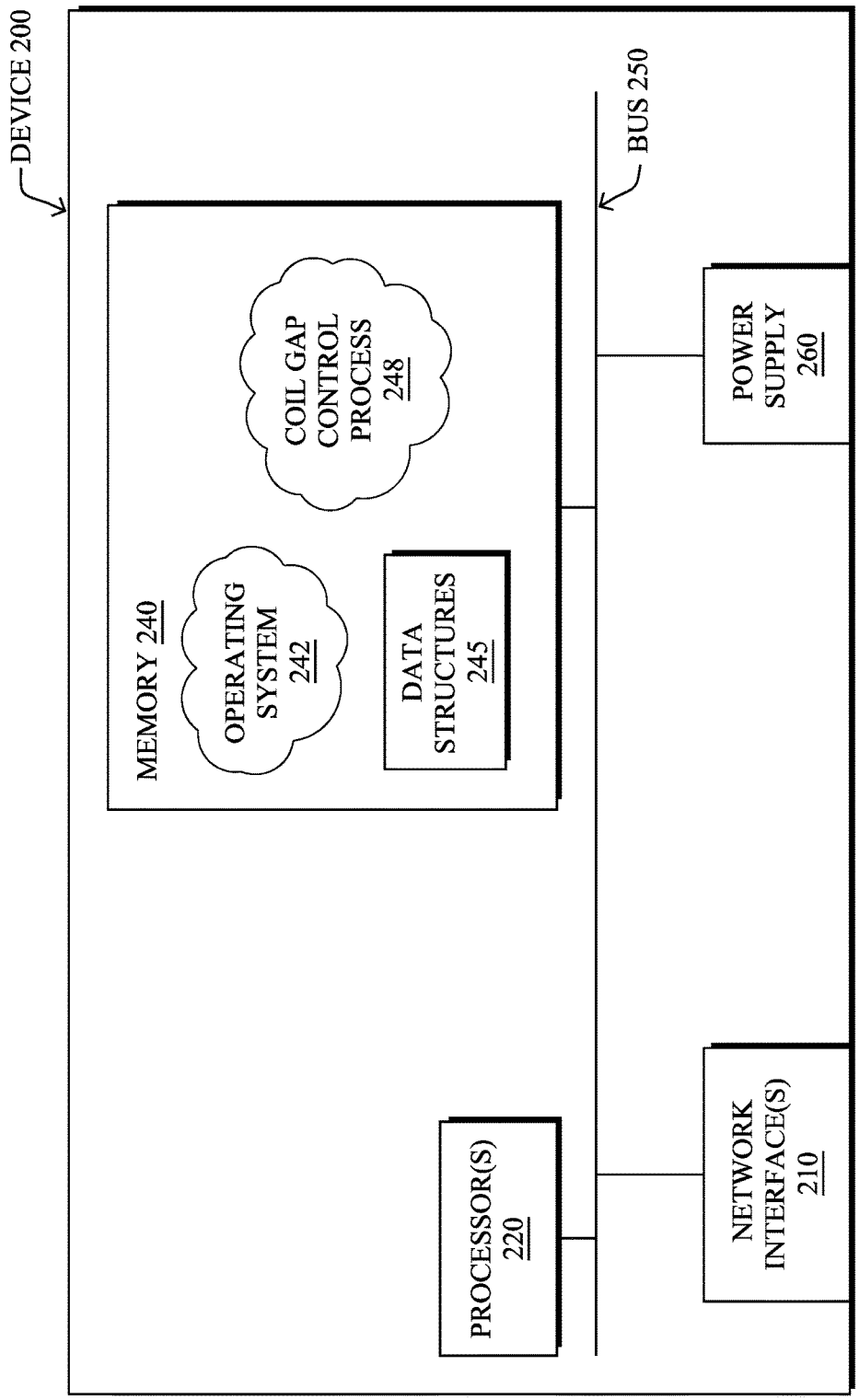
FIG. 2 illustrates an example network device/node.

FIG. 2 is a schematic block diagram of an example computing device/node 200 that may be used with one or more embodiments described herein e.g., as any of the devices shown in FIG. 1 above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration. Also, while the network interface 210 is shown separately from power supply 260, for fog modules using PLC, the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative coil gap control process 248, as described herein.

In general, gap control process 248 may be configured to adjust the gap between wireless power transfer (WPT) coils for a vehicle charging system. In some embodiments, gap control process 248 may do so by leveraging machine learning, to learn and adapt to the various characteristics of the vehicle and/or the ground-based charging coils. In general, machine learning is concerned with the design and the development of techniques that take as input empirical data (such as the height adjustment to either or both WPT charging coils, the provided charge, etc.), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, gap control process 248 may employ one or more supervised, unsupervised, or semi-supervised machine learning models. Generally, supervised learning entails the use of a training set of data, as noted above, that is used to train the model to apply labels to the input data. For example, the training data may include test results for different coil gaps and their associated amounts of charge conveyed to the vehicle. On the other end of the spectrum are unsupervised techniques that do not require a training set of labels. Notably, while a supervised learning model may look for previously seen patterns that have been labeled, as such, an unsupervised model may instead look to whether there are sudden changes in the behavior. Semi-supervised learning models take a middle ground approach that uses a greatly reduced set of labeled training data.

Example machine learning techniques that gap control process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, WPT is an emerging technology that has proven to be effective for charging electric vehicles (EVs). In a typical WPT setup for EVs, a ground-based coil is supplied power, thereby inducing a current remotely in a second, vehicle-based coil located at the bottom of the EV.

In a dynamic WPT scenario, a moving EV can travel over the ground-based coils where energy is transferred to the cars as they pass over the coils. To improve energy efficiency and/or keep the level of electromagnetic radiation low, some implementations may (only) energize the ground-based coils when the EV is on top of the coils. Note that superconducting coils could also be used, thereby lowering the energy loss, but these types of coils are unlikely to be used in typical implementations. In addition, regulating when the coils are energized could prevent heating issues, which could otherwise damage the infrastructure and lead to reliability issues.

FIGS. 3A-3D illustrate an example of powering a ground-based charging coil for an upcoming vehicle, according to various embodiments. Continuing the example of FIG. 1B, assume in FIG. 3A that vehicle 160 is in communication with supervisory service 170 and/or RSU 150 that are part of a vehicle WPT system. During operation, vehicle 160 may send data regarding the vehicle characteristics to service 170 and/or RSU 150 for further processing. Example vehicle characteristics 302 may include, but are not limited to, any or all of the following:

- A location of vehicle 160—for example, this information can include a Global Positioning System (GPS) coordinate from vehicle 160, navigation information from a subsystem of vehicle 160 (e.g., a vehicle navigation system), a signal that can be used to triangulate the location of vehicle 160, etc.
- A velocity of vehicle 160—this information can be used to determine whether vehicle 160 is stationary or in motion, as well as timing information, to determine when the charging coils of vehicle 160 are expected to be in close proximity to a particular one of the ground-based charging coils 164. If this information is not provided, it can be derived based on changes in the location of vehicle 160 over time.
- Acceleration information for vehicle 160—in some cases, vehicle 160 may also provide acceleration information as part of vehicle characteristics 302, such as from its accelerometer. If this information is not provided, it can be derived based on changes in the velocity of vehicle 160 over time.
- Make, model, and/or options of vehicle 160—this information can be used to determine the specific charging capabilities of vehicle 160 from the factory. For example, a certain manufacturer may offer upgraded charging systems on certain models over others (e.g., a larger capacity battery, a larger charging coil, etc.).
- Coil information for vehicle 160—this information may include data regarding the physical dimensions of vehicle-based charging coil 162 and/or the location of coil 162 on vehicle 160. For example, this information may indicate the size and/or shape of coil 162 (e.g., length and width measurements, if coil 162 is rectangular, a radius measurement, if coil 162 is circular, etc.). In another example, the coil information regarding coil 162 may indicate the distance between coil 162 and one or more sides of vehicle 160 (e.g., coil 162 may be ⅔ of the way from the front of vehicle 160, x-number of feet or inches from the passenger or driver's side of vehicle 160, etc.). This information can be used to indicate whether coil 162 is perfectly centered on vehicle 160 or, if not, its offsets from the center. In a further example, the information regarding coil 162 can also indicate the height or planarity of coil 162 relative to the ground (e.g., a height of M1 inches when vehicle 160 is not moving, a height of M2 inches when vehicle 160 is traveling at slow speeds, a height of M3 inches when vehicle 160 is traveling at highway speeds, etc.). In various embodiments, the coil information for vehicle 160 can also be retrieved (e.g., by service 170), based on the make, model, and/or options of vehicle 160.
- Age of vehicle 160—As noted above, battery life and charging capabilities of a vehicle can change over time. This information can be used to predict how much of a change is expected from that of the factory configuration. For example, this information may comprise the year in which vehicle 160 was made.
- Battery specifications of vehicle 160—if the battery cannot be identified, such as when the make/model of vehicle 160 is not available, vehicle 160 can nonetheless provide the specifications of its battery as part of vehicle characteristics 302, in some cases.
- Maintenance history of vehicle 160—For example, if the battery of vehicle 160 was replaced at some point in time, this information can be pertinent to determining the appropriate charging parameters for vehicle 160.
- Battery management system (BMS) data from vehicle 160—this data can include any information regarding the current and/or prior states of the battery of vehicle 160. For example, the BMS data may be indicative of the existing charge in the battery of vehicle 160, a history of charging of the battery of vehicle 160, the current battery temperature and/or surrounding temperature, or the like.
- Authentication information from vehicle 160—in the case where WPT charging is restricted, provided on a controlled basis (e.g., only to residents, only on a paid basis, etc.), or the like, this information can also be included in vehicle characteristics 302.
- Surrounding information regarding vehicle 160—further information regarding the surroundings of vehicle 160 may include, for example, information regarding other vehicles within proximity of vehicle 160. Such information may be obtained, for example, by cameras, LIDAR, radar, or other sensors that may be located on vehicle 160 or along road 166.

As would be appreciated, any or all of the above vehicle characteristics 302 may be determined by vehicle 160 or, alternatively, by RSU 150 (e.g., based on sensor data from sensors of RSU 150, etc.).

Figure 3A:
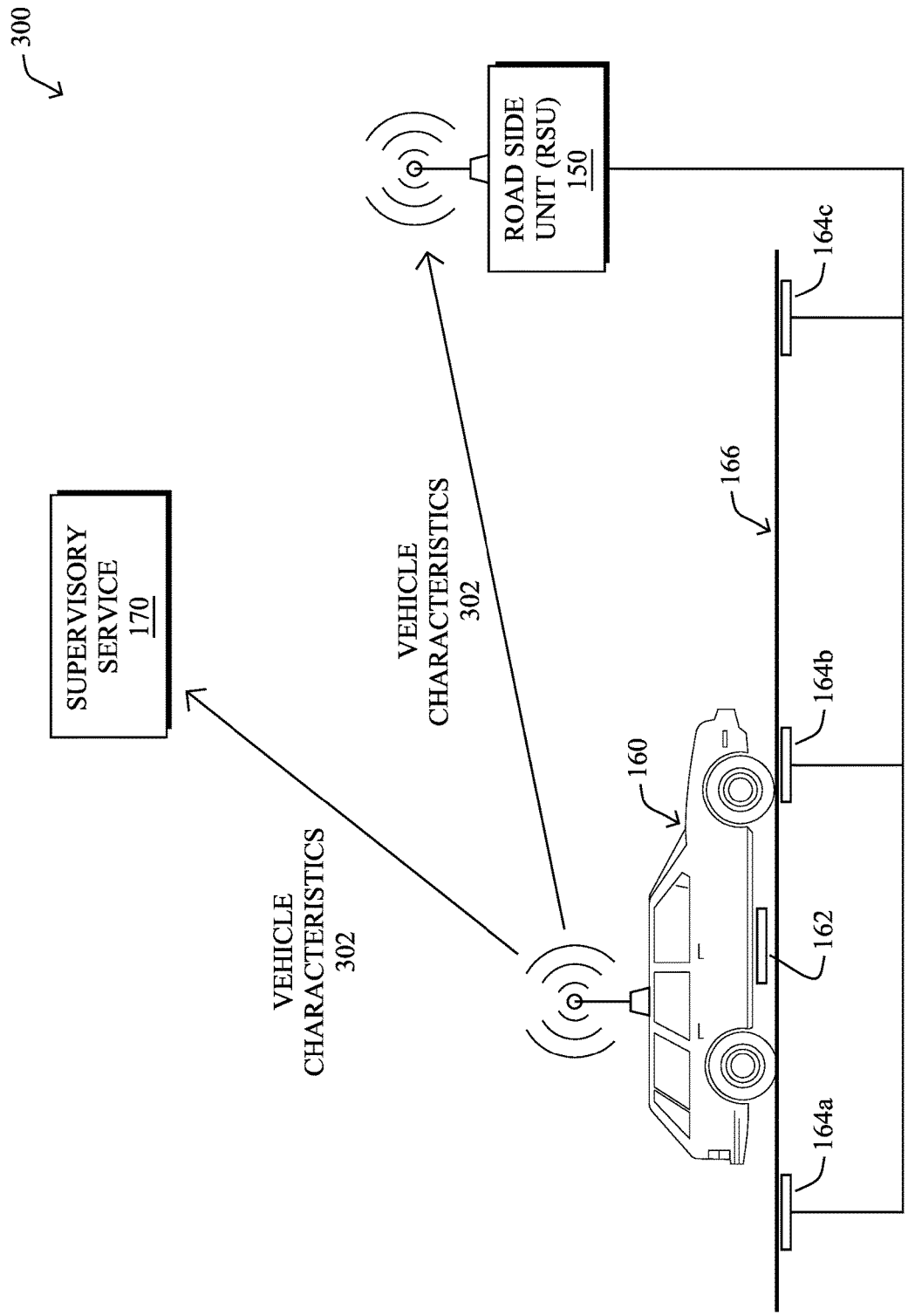
FIGS. 3A-3D illustrate an example of powering a ground-based charging coil for an upcoming vehicle.
Figure 3B:
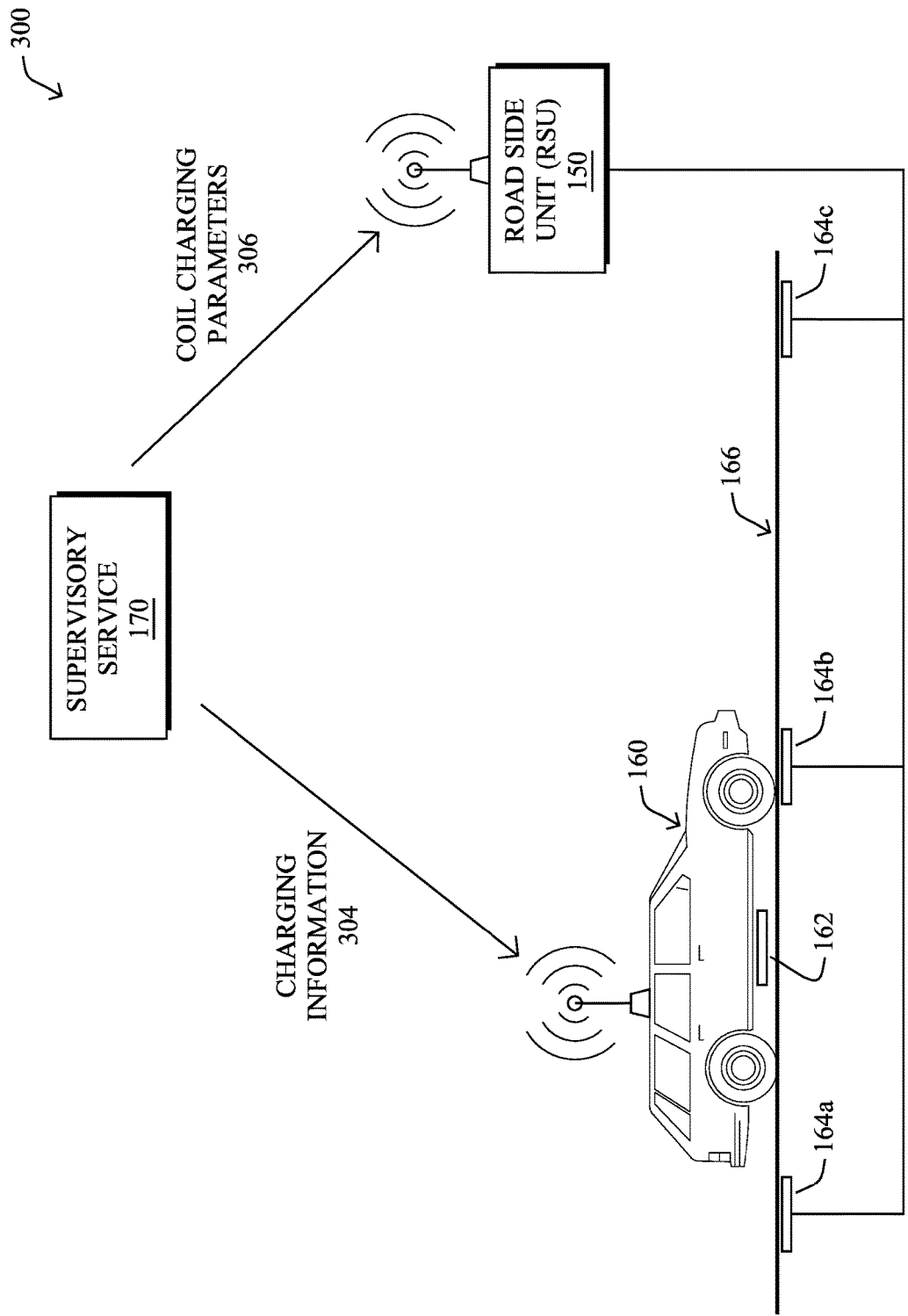

In FIG. 3B, supervisory service 170 may use the received vehicle characteristics 302, to determine the appropriate coil charging parameters 306 for ground-based charging coils 164. Generally, coil charging parameters 306 may indicate which of ground-based charging coils 164 are to be powered, if any, when coils 164 should be powered, and the appropriate power level to be supplied. For example, based on the vehicle characteristics 302, supervisory service 170 may determine that the charging coil 162 of vehicle 160 will be in close proximity (e.g., less than several feet) with that of ground-based charging coil 164*b* at a time $t=t_1$. In addition, supervisory service 170 may determine that vehicle 160 requires charging, is authorized to charge, and/or an amount of power that should be delivered to the identified ground-based charging coil 164*b*. Note that in further embodiments, any or all of these determinations may be made at the fog layer, such as by RSU 150.

In case of dynamic WPT, supervisory service 170 may also communicate charging information 304 back to vehicle 160 regarding the charging process. For example, charging information 304 may include driving parameters while vehicle 160 is in motion (e.g., directing vehicle 160 to maintain a certain speed, stay in the current lane, etc.), confirmations or notifications regarding the charging, or the like.

In some embodiments, charging information 304 may include alignment information that can be used by vehicle 160 to ensure that vehicle-based charging coil 162 is properly aligned with ground-based charging coil 164, when vehicle 160 passes over coil 164. For example, charging information 304 may indicate to vehicle 160 the lane in which coil 164 is situated and potentially the proper position for vehicle 160 within that lane. In addition, service 170 may also determine the optimal lane position for vehicle 160 and include this in charging information 304, so as to maximize the transfer of power during charging by ground-based charging coil 164 (e.g., such that the overlap of coils 162 and 164 is maximized).

In situations when ground-based charging coil 164 is in the center of the lane and vehicle-based charging coil 162 is located at the center of vehicle 160 (e.g., in terms of side-to-side dimensions), then coil alignment is relatively easy and vehicle 160 simply needs to drive down the center of the lane. However, in many cases, ground-based charging coil 164 may be offset from the center of the lane (e.g., six inches to the right of lane center, etc.) or vehicle-based charging coil 162 may not be located centrally on vehicle 160 (e.g., four inches left of vehicle center, etc.). In such cases, including alignment information in charging information 304 allows vehicle 160 to be directed towards the proper lane and alignment, for maximum charging. For example, charging information 304 may indicate that vehicle 160 should drive ten inches to the right of lane center, to maximize the overlap, if coil 164 is six inches to the right of the center of the lane and coil 162 is four inches to the left of the center of vehicle 160. This relatively small change of ten inches may lead to a significant increase in the percentage of overlap between coils 162 and 164 and, therefore, the power transfer.

Implementation of the recommended lane and alignment can be achieved either autonomously, if vehicle 160 is so capable, or via feedback to the driver. For example, vehicle 160 may be equipped to translate charging information 304 into alerts for the driver of vehicle 160, such as voice alerts, video alerts (e.g., on a dash-based display), or even augmented reality alerts via a windshield-based display, to direct the driver to move vehicle 160 to a specific lane and/or how to position vehicle 160 within the lane.

Figure 3C:
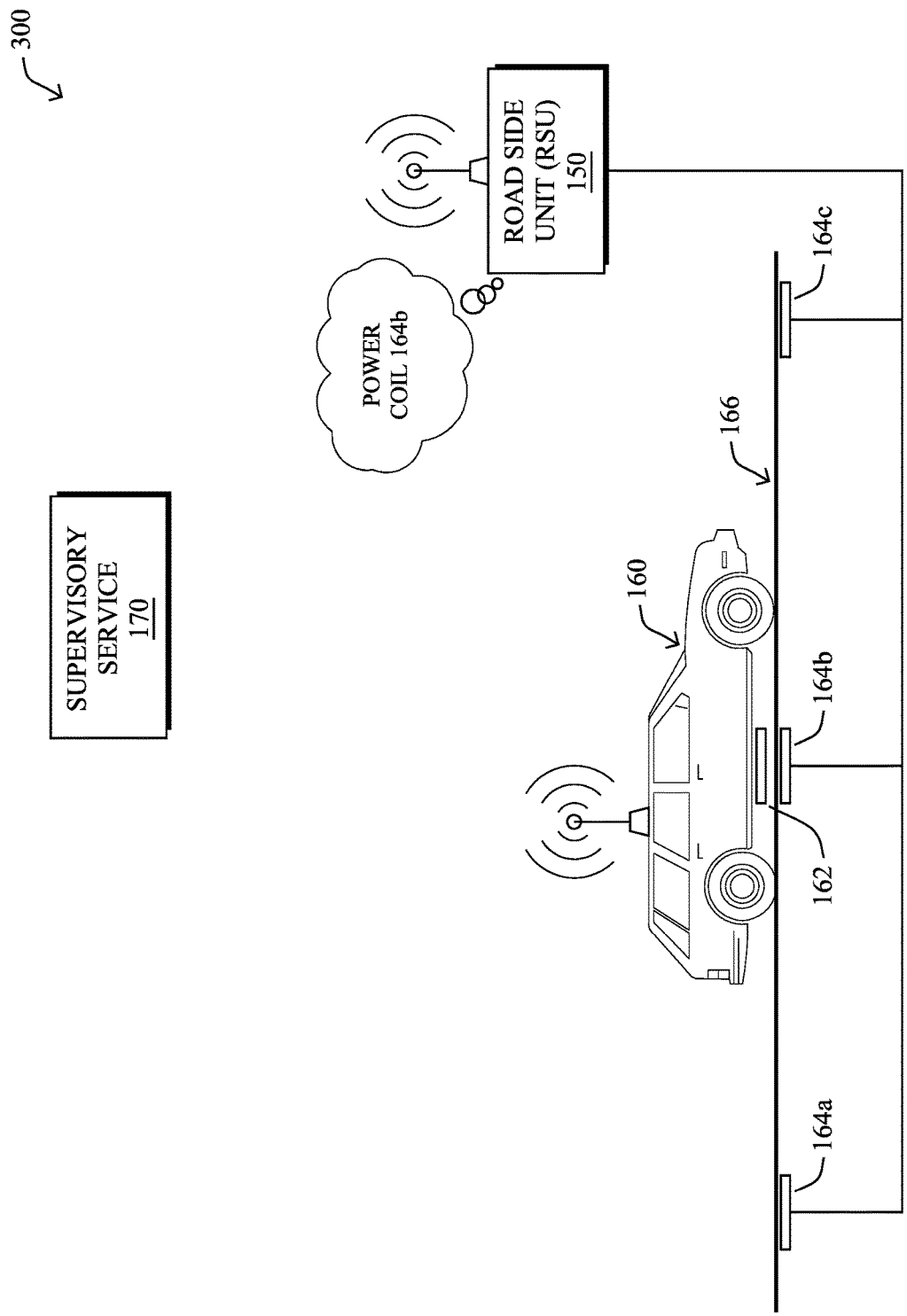

In FIG. 3C, RSU 150 may provide power to ground-based charging coil 164b, based on coil charging parameters 306. For example, RSU 150 may cause ground-based charging coil 164b to be powered to a certain power level, in advance of vehicle 160 arriving at ground-based charging coil 164b. Thus, when vehicle-based charging coil 162 is within charging proximity of ground-based charging coil 164b, the two coils may inductively couple with one another, thereby transferring power to vehicle 160 that can be used to charge the battery of vehicle 160.

Figure 3D:
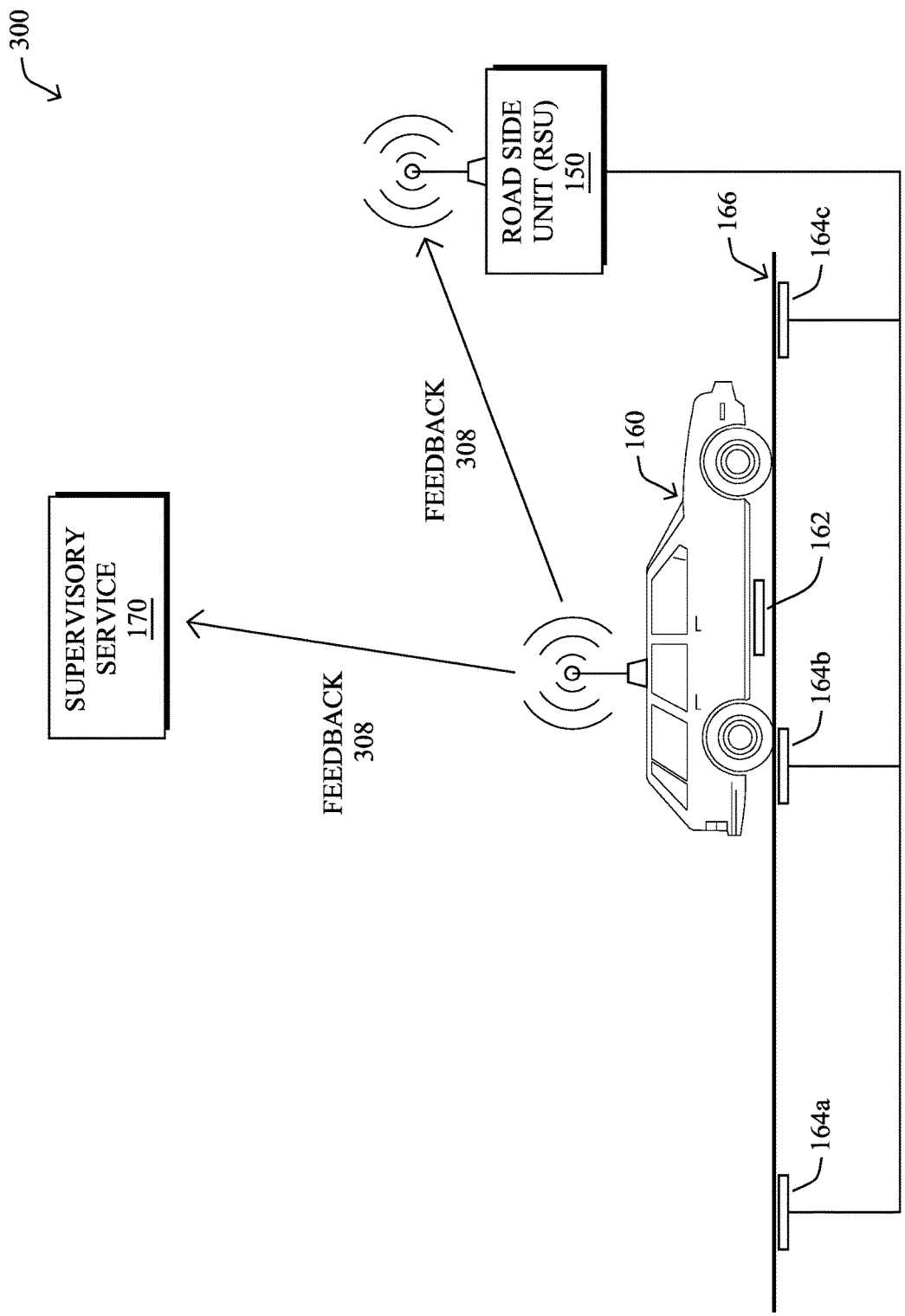

In FIG. 3D, vehicle 160 may also provide feedback 308 to supervisory service 170, and/or to RSU 150, regarding the charging from ground-based charging coil 164b. For example, feedback 308 may be indicative of the amount of charge that vehicle 160 was able to obtain from ground-based charging coil 164b, timing information in terms of the power transfer, or any other information regarding the charging operation. Such feedback can be used, in some embodiments, to update a machine learning model that seeks to optimize the power transfer process.

One factor that can greatly affect the amount of electrical power actually transferred to the vehicle is the gap between the vehicle-based charging coil and the ground-based charging coil during the power transfer. In a typical vehicle scenario, this gap can be affected by a number of conditions including, but not limited to: 1.) the number of passengers or amount of load in the vehicle, which can cause it to sag unevenly, 2.) uneven tire inflation of the vehicle, 3.) uneven wear and tear of tires of the vehicle, and 4.) uneven wear and tear of shocks and struts of the vehicle.

Furthermore, these factors would cause a non-coplanar alignment of the coils. This means that the two coil faces may not be exactly parallel to each other. Even if the coil on the vehicle was initially perfectly horizontal at the time of mounting, the above factors can cause that perfectly horizontal alignment to change over time. In other words, the air gap may be larger on one side or corner and may be smaller on the other side or corner. All such misalignment issues contribute to an inefficient energy transfer.

Beyond the current state of the vehicle, additional factors that can affect the gap between the coils can include improperly installed coils from the manufacturer, improperly installed coils in the infrastructure (e.g., roads, pavement, parking garages and lots, etc.), and/or changes in the ground due to earth movements, seasonal changes, and the like (e.g., frost heaving, etc.). Once installed, it is also often very difficult to re-align the coils precisely.

Gap Control for Vehicle Wireless Power Transfer (WPT)

In certain aspects, the techniques herein relate to the automated control over the gap between a ground-based coil and a vehicle-based coil in a wireless power transfer (WPT) system for electric vehicles (EVs). Such a gap can affect the efficiency of the power transfer process. In some aspects, the vehicle suspension and/or coil height(s) can be controlled, to optimize the gap between the coils.

Specifically, according to one or more embodiments of the disclosure as described in detail below, a device in a wireless power transfer (WPT) system receives data regarding a vehicle equipped with a vehicle-based charging coil configured to receive electrical power transferred from a ground-based charging coil of the WPT system. The device determines, based on the received data, a time at which the vehicle-based charging coil is expected to be in charging proximity of the ground-based coil. Based on the received data, the device determines a gap distance between the vehicle-based charging coil and the ground-based charging coil to optimize the transfer of electrical power from the ground-based charging coil to the vehicle-based charging coil when the coils are in charging proximity of one another. The device sends control instructions to an adjustment system to implement the identified gap distance in advance of the determined time by adjusting a height of the vehicle-based charging coil or the ground-based charging coil.

Illustratively, the techniques described herein may be performed by hardware, software, and/or firmware, such as in accordance with the illustrative gap control process 248, which may include computer executable instructions executed by the processor 220 (or independent processor of interfaces 210) to perform functions relating to the techniques described herein.

Operationally, various techniques for adjusting the gap between vehicle-based and ground-based coils for vehicle WPT are introduced herein. Generally, as shown, a WPT vehicle, such as an automobile, motorcycle, truck, aircraft, autonomous drone, or any other type of vehicle configured to receive WPT power, may include at least one vehicle-based coil for power transfer to or from at least one ground-based coil. In addition, various types of adjustment systems, described in more detail below, may be used to control the gap between the coils in order to provide optimum power transfer. The adjustment system may be controlled via electronic communications (e.g., by instructions provided by a device in a network) to determine when the vehicle is within charging proximity and how to adjust the gap between the coils.

Figure 4:
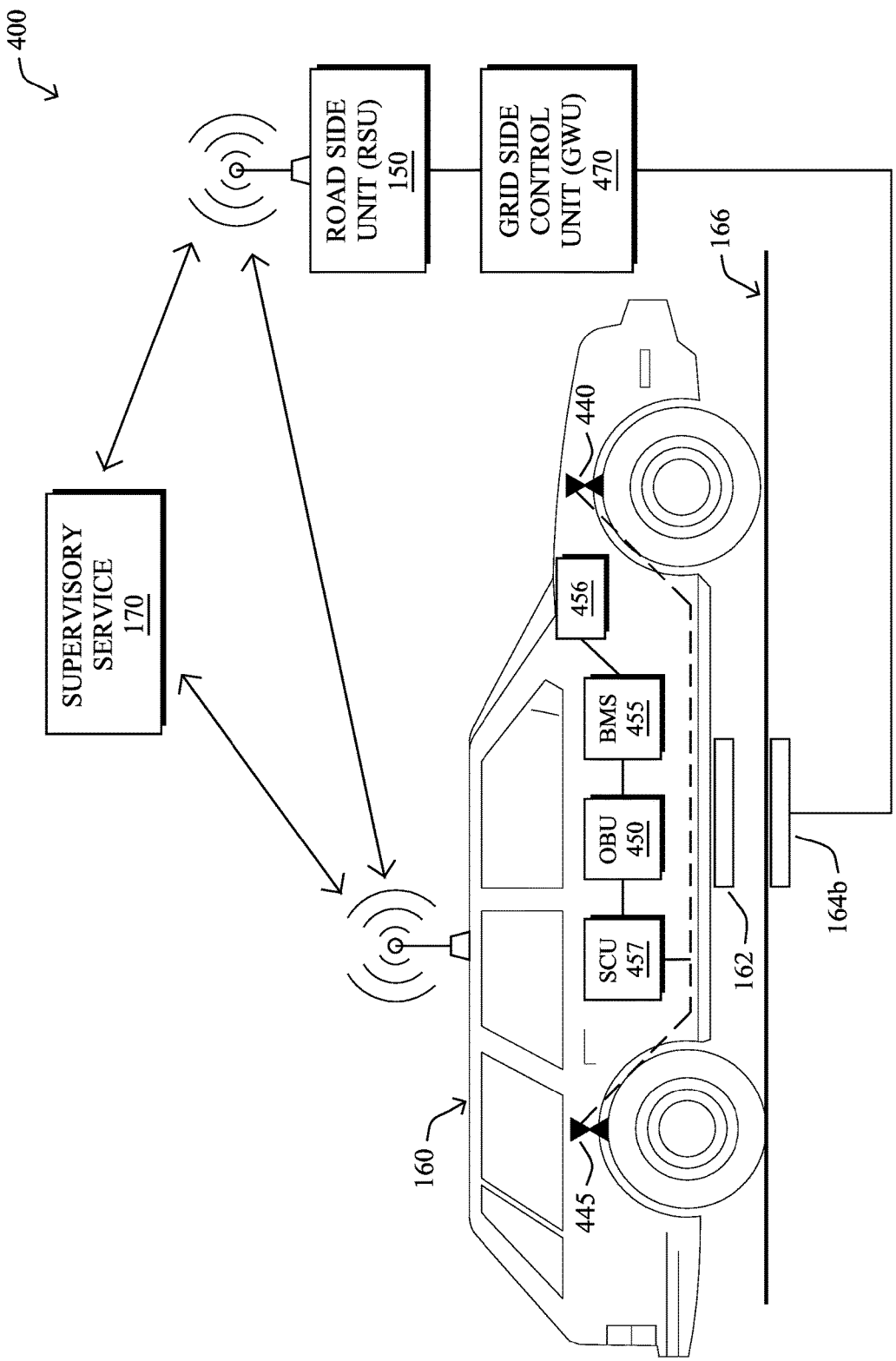
FIG. 4 illustrates an example of adjusting the suspension of a vehicle, to control the gap between WPT charging coils.

FIG. 4 illustrates an example 400 of adjusting the suspension of a vehicle, to control the gap between WPT charging coils, according to various embodiments. As described above, vehicle 160 may be in communication with RSU 150 and/or supervisory service 170, so that ground-based charging coil 164b is powered in advance of vehicle-based charging coil 162 coming within charging proximity of coil 164b. More specifically, based on the movement and/or predictive movement of vehicle 160, RSU 150 may send an indication of the appropriate charging information to a grid side control unit (GCU) 470 that powers ground-based charging coil 164b, accordingly. Note that GCU 470 may be integrated into RSU 150, in some implementations.

As shown, vehicle 160 may include a number of subsystems, to facilitate the transfer of power. For example, vehicle 160 may further comprise an On Board Unit (OBU) 450 that communicates with the other local systems of vehicle 160 and communicates with RSU 150 and/or supervisory service 170. In addition, vehicle 160 may include a Battery Management System (BMS) 455 that oversees the local battery 456 of vehicle 160 and regulates the charging thereof.

In various embodiments, OBU 450 may further be in communication with a local Suspension Control Unit (SCU) 457 of vehicle 160 that that provides control and adjustment of the vehicle suspension through adjustable suspension components 440 and 445 (e.g., adjustable shocks, struts, etc.). In other words, SCU 457 and adjustable suspension components 440-455 may operate as an adjustment system that adjusts the height of vehicle 160 and the plane of vehicle-based charging coil 162 relative to road 166.

The operation of the WPT system with respect to coil gap control may proceed as follows:
1. As the power transfer operation begins, GSU 470 on the grid side may communicate with BMS 455 on vehicle 160 via the link between OBU 450 and RSU 150, to monitor the efficiency of the power transfer from ground-based coil 164b to vehicle-based charging coil 162.
2. GSU 470 compares the reported power transfer statistics from BMS 455 with a history (e.g., database) of available system-wide information regarding vehicle 160 or one or more other similar vehicles (e.g., in terms of make, model, options, version of WPT, etc.).
3. If GSU 470 determines that the power transfer efficiency deviates from an expected amount or range (e.g., based on previous charging operations or manufacturer's specifications), GSU 470 may predict non-coplanarity and/or an optimal air gap between coils 162 and 164b. Said differently, GSU 470 may determine an appropriate coil gap and/or planarity for coils 162, 164b that is predicted to increase the efficiency of the power transfer. As noted above, this determination may be made in the fog (e.g., on RSU 150 or GSU 470) or, alternatively, in the cloud (e.g., by supervisory device 170), and potentially by a machine learning-based process trained to determine the optimal coil configuration based on the various vehicle and/or road characteristics.
    To begin with, the orientation of vehicle-based charging coil 162 can be detected through analysis of its equivalent of mechanical or electrical levels and/or via sensors local to vehicle 160. Based on this information, coil 162 can be adjusted so that it is parallel with the idealized ground (idealized because the ground and most specifically coil 164b in the ground may be tilted).
    Tiny electronic magnetometers can be arranged around vehicle-based charging coil 162 and can estimate with high sensitivity the magnetic flux going through each of them. Each location may have 3 magnetometers oriented along the three primary axis (x-y-z) and used to detect the magnetic flux in each direction, in one embodiment. By looking at the readings around coil 162 (e.g., at four locations on vehicle 160 closest to the four wheels/suspensions) and the magnetic flux detected in each of the three directions at each location, GSU 470 can determine the orientation of coil 162 relative to ground-based charging coil 164b.
    Note that the total flux at each location of the on-board coil may be different based on its relative position and orientation vs the primary (ground) coil. However, examining the flux in each direction (x-y-z) normalized by the total flux across all thee directions, can overcome the effect of different total fluxes at each location.
4. The system can quickly achieve equilibrium since the power transfer efficiency can be calculated and monitored continuously. In other words, GSU 470 can assess the power transfer efficiency and the current orientation/height of coil 162 relative to road 166/coil 164b, and provide control commands to SCU 457 to adjust the height of vehicle 160 to effect an optimal coil gap between coils 162, 164b, as part of a closed loop control mechanism.
5. Also, by using the statistical guidance based on various factors such as make, model, option, version of WPT etc. from the global database of supervisory service 170, the system can guarantee a quick convergence instead of chasing a theoretical ideal number, which may never converge.
6. Furthermore, GSU 470 may add the best efficiency numbers achieved during the power transfer for the given conditions to the global database of supervisory system 170 for further use. This makes the system self-learning and thus continuously improving.

Note that the adaptive suspension adjustments may be applied in static WPT, quasi-static WPT, and dynamic WPT. In dynamic WPT, the movement of vehicle 160, and the angle of road 166 (e.g., flat or uphill or downhill) may lead to vehicle-based charging coil 162 and ground-based charging coil 164b to have a relative angle that exists for as long as the vehicle and ground are in the same relative situation (e.g., same speed, angle of ground, etc.). During this time, an adjustment of the coil 162 can lead to a beneficial improvement in coupling between the coils 162 and 164b.

In other words, before or during the transfer of power from ground-based charging coil 164b to vehicle-based charging coil 162, the system may send control commands to vehicle 160 that can be used by SCU 457 to adjust the height of vehicle 160 as a whole, adjust the height of vehicle 160 at individual corners of vehicle 160. For example, assume that adjustable suspension components 440 and 445 are currently configured such that coils 162 and 164b are separated by a coil gap of seven inches, but that the system determines that the optimal gap is six inches. In such a case, suspension components 440, 445 may be controlled (e.g., via SCU 457), to lower vehicle 160 by an inch.

In various embodiments, the adjustment of the coil gap can be performed predictively and/or adaptively. For example, the system may use machine learning to predict the coil gap that will optimize the power transferred from coil 164b to coil 162, such as by modeling prior power transfers to vehicle 160, itself, and/or to other vehicles of its kind. In addition, feedback can be used in real time, to adaptively control the gap during charging. In addition to the gap control (e.g., in the z-direction), the system can also control the orientation of the coil.

Figure 5:
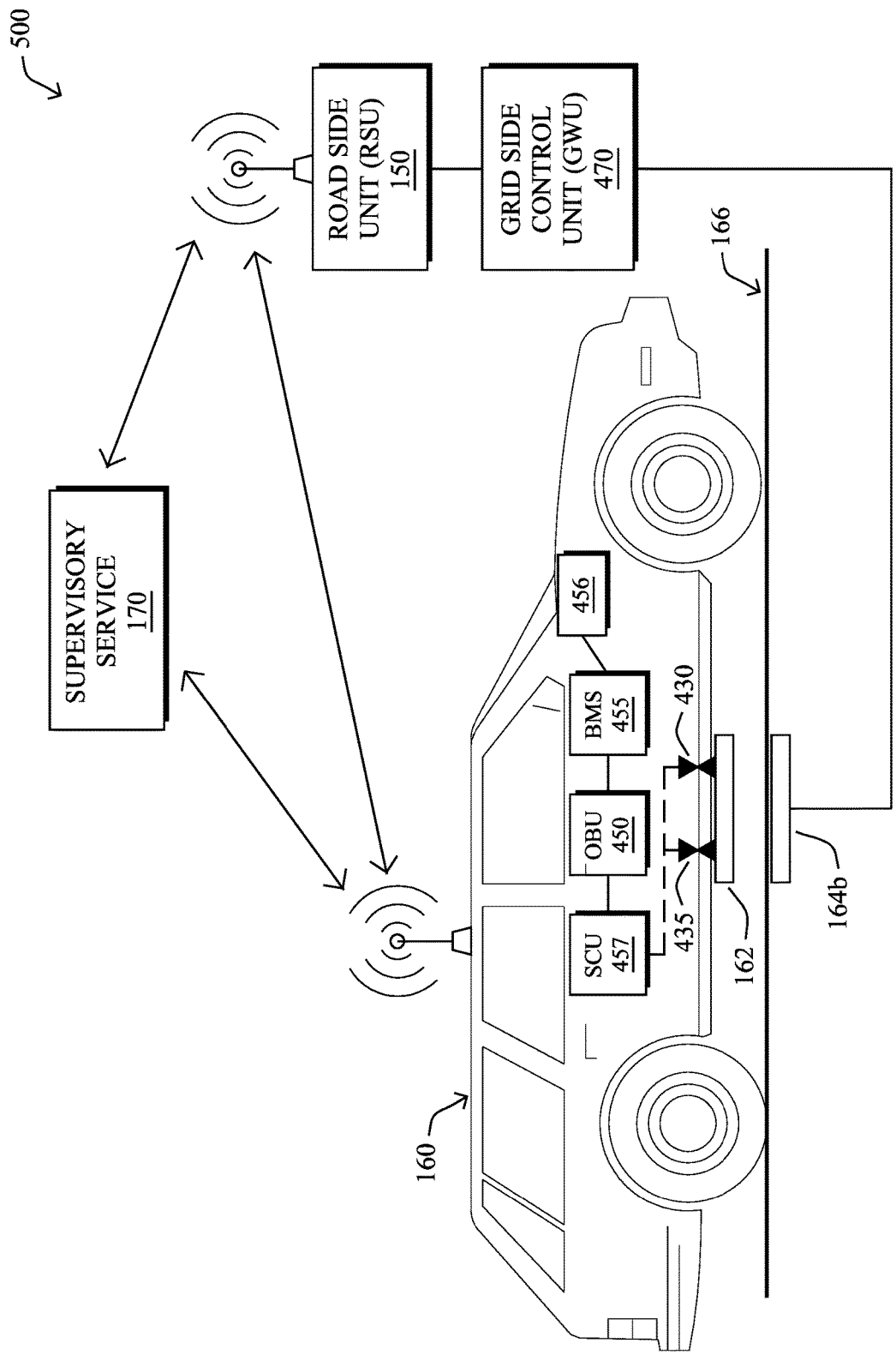
FIG. 5 illustrates an example of adjusting a height of a vehicle-based charging coil, to control the gap between WPT charging coils.

FIG. 5 illustrates another example of control over the gap between WPT charging coils. As shown, another possible coil adjustment system may comprise one or more adjustable members 430-435 that are coupled to vehicle-based charging coil 162 and controlled by SCU 457. In other words, vehicle-based charging coil 162 may be configured with its own adjustable suspension that can be controlled to adjust the gap between coil 162 and ground-based charging coil 164b.

Any suitable form of adjustable members 430-435 may be used such as hydraulic, pneumatic, or electronic risers. In addition, the number of such members may be selected as desired (e.g., to only control the vertical movement of coil 162 or to have additional control over the orientation thereof). This may be a more viable approach because it can avoid adjusting the ride quality and aerodynamics when used in dynamic WPT with vehicles in motion.

Control over members 430-435 may be performed in much the same way as described above with respect to controlling the suspension of vehicle 160. Namely, the system may predict an optimal coil gap between coils 162 and 164b (e.g., a gap that maximizes the power transfer) and, in turn, send control commands to SCU 457 to adjust members 430-435, accordingly.

Figure 6:
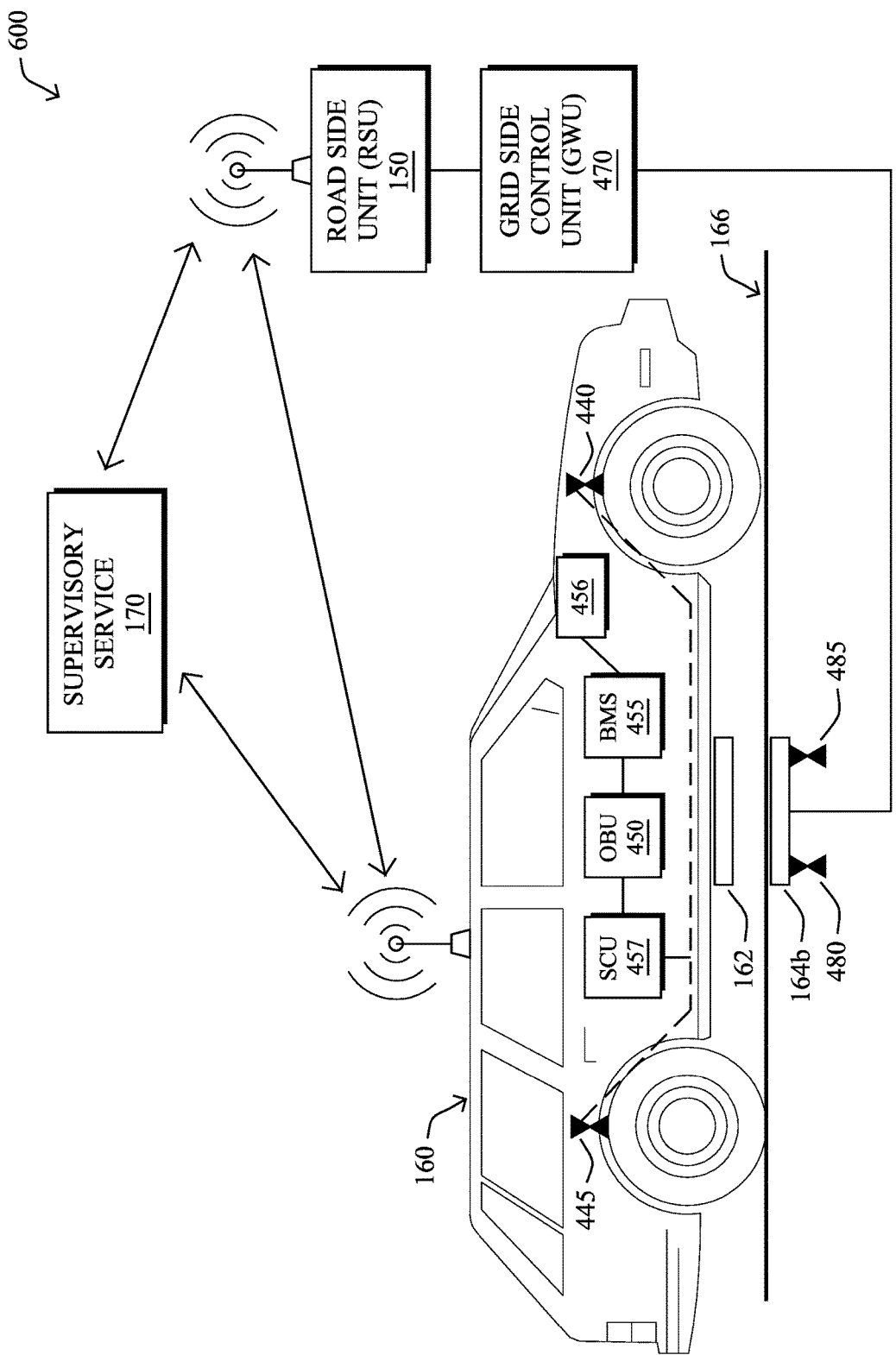
FIG. 6 illustrates an example of adjusting a height of a ground-based charging coil, to control the gap between WPT charging coils.

FIG. 6 illustrates yet another example of controlling the coil gap between a vehicle-based coil and a ground-based charging coil. In yet further embodiments of the techniques herein, the gap adjustment system may comprise adjustable members 480-485 coupled to ground-based charging coil 164b. Similar to the adjustable members 430-435 described above with respect to vehicle-based charging coil 162, adjustable members 480-485 may be hydraulic, pneumatic, or electronic risers that the WPT system can control, to adjust the height and/or orientation of coil 164b.

Notably, if the distance between coil 162 and road 166 is reported by vehicle 160 (e.g., in conjunction with the reported charging metrics from BMS 456), the WPT system may determine whether any height and/or planarity adjustments need to be made to ground-based charging coil 164b, to effect the optimal coil gap with vehicle-based charging coil 162. In turn, GCU 470 may send the corresponding control commands to members 480-485, to raise or lower ground-based charging coil 164b (and/or adjust the orientation of coil 164b), accordingly.

In various embodiments, the adjustment mechanisms described above can also be implemented in conjunction with one another. For example, as shown in FIG. 6, vehicle 160 may also be equipped with an SCU 457 and adjustable members 430-435 that are part of the suspension of vehicle 160. In another example, vehicle-based charging coil 162 may be equipped individually with adjustable members 430-435 and ground-based charging coil 164b may also be equipped with adjustable members 480-485. When multiple options are available to adjust the coil gap, the system may select one of the methods (e.g., by only adjusting the height of coil 164b) or may opt to take a hybrid approach by controlling both systems (e.g., by lowering vehicle 160 and raising coil 164b, to effectuate the desired coil gap).

Figure 7:
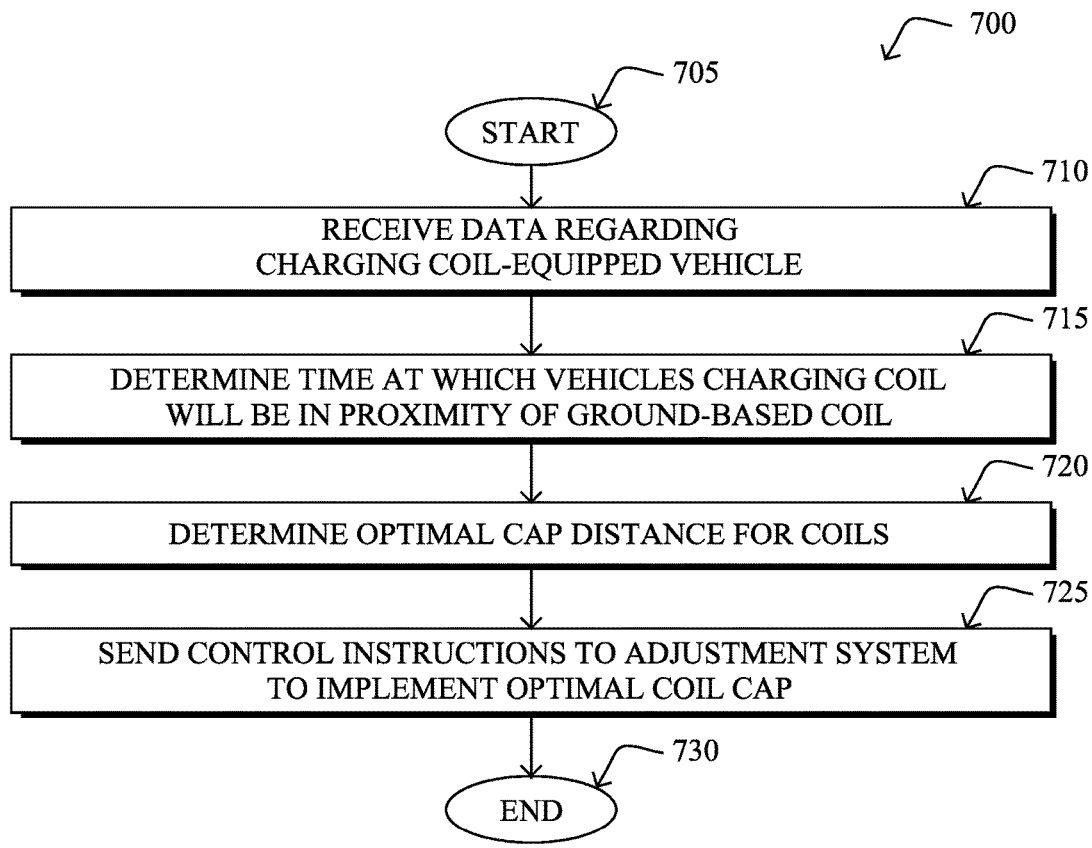
FIG. 7 illustrates an example simplified procedure for adjusting a gap between a vehicle-based coil and a ground-based coil.

FIG. 7 illustrates an example simplified procedure for controlling the gap between a vehicle-based coil and a ground-based coil in a wireless power transfer system for electric vehicles. For example, a non-generic, specifically configured device (e.g., device 200) may perform procedure 700 by executing stored instructions (e.g., coil gap control process 248). The procedure 700 may start at step 705 and continues to step 710, where, as described in greater detail above, a device in the wireless power transfer system receives data regarding a vehicle equipped with a vehicle-based charging coil configured to receive electrical power from a ground-based charging coil of the WPT system. In some embodiments, data is received from a cloud-based system or other network, such as supervisory service to access a database of information (e.g., power transfer efficiencies) for different types of vehicles. In particular, vehicle data may include vehicle type, make, model, or other information useful to reduce the gap between the vehicle-based coil and the ground-based coil.

At step 715, as described in greater detail above, the device determines a time at which the vehicle-based charging coil is expected to be in charging proximity of the ground-based coil, based on the received data. Such a determination may be made, for example, by communication by the device with the vehicle, with the ground-based coil, or by coordination of the device with various vehicle location systems (e.g., a GPS). In some embodiments, when the vehicle will be within charging proximity may be determined, for example, based on the location of the vehicle, the position of the vehicle-based coil on the vehicle, the location of the ground-based coil, and the vehicle speed. Other techniques may also be used.

At step 720, based on the received data, the device determines, based on the received data, a gap distance between the vehicle-based charging coil and the ground-based charging coil to optimize the transfer of electrical power from the ground-based charging coil to the vehicle-based charging coil when the coils are in charging proximity of one another. In particular, in some embodiments, the GSU of the WPT system, in communication with the ground-based coil, may communicate with the BMS of the vehicle using the RSU-OBU link (e.g., though wireless communication) and may monitor power transfer efficiency. The GSU may compare the efficiency with the available history and statistical optimum efficiency gap value for the specific type of vehicle (e.g., make, model, option, version of WPT and so on). If a divergence beyond expected deviation is detected by the GSU, non-co-planarity would be predicted and the gap between the coils may be adjusted to increase the efficiency of power transfer.

At step 725, as described in greater detail above, the device sends control instructions to an adjustment system to implement the identified gap distance in advance of the determined time by adjusting a height of the vehicle-based charging coil or the ground-based charging coil. For example, the orientation of the vehicle-based coil may be detected, such as by mechanical or electrical levels. Based on this information, the vehicle-based coil can be adjusted so that it is parallel with the ground beneath it, assuming the ground-based coil is also parallel with the ground. In some embodiments, adjustment of the vehicle-based charging coil may comprise adjusting the suspension system of the vehicle (e.g., to raise or lower one or more corners of the vehicle), thereby correcting the planarity of the vehicle-based coil. In some embodiments, control instructions may be sent to a suspension system of the vehicle-based coil itself in order to adjust the planarity of the coil directly. If necessary, the ground-based coil may also be adjusted as a result of control instructions sent by the device to a suspension system of the ground-based coil, such as to change its planarity and change the gap distance to the vehicle-based coil. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. In addition, the steps within procedure 700 may be repeated any number of times, in some embodiments, such as part of an iterative process that leverages machine learning to learn the optimal coil gap parameters over time.

The techniques described herein, therefore, provide the automatic adjustment of a gap between a vehicle-based coil and a ground-based coil in a WPT system, allowing for a more efficient power transfer. The system can quickly achieve equilibrium since the power transfer efficiency can be calculated and monitored continuously, enabling the system that tries to tune by adjusting and achieves maximum efficiency quickly. In addition, by using statistical guidance based on various factors such as make, model, option, version of WPT etc. from a global database in cloud, the system can guarantee a quick convergence instead of chasing a theoretical ideal number which may never converge. Furthermore, the best efficiency numbers achieved during this operation for given conditions may be added to the statistical global database, which makes the system self-learning and thus continuously improving.

While there have been shown and described illustrative embodiments that provide for coil gap control in a vehicle WPT system, it is to be understood that various other adaptations and modifications may be made within the spirit and scope of the embodiments herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a device in a wireless power transfer (WPT) system, data regarding a vehicle equipped with a vehicle-based charging coil configured to receive electrical power transferred from a ground-based charging coil of the WPT system;
   determining, by the device and based on the received data, a time at which the vehicle-based charging coil is expected to be in charging proximity of the ground-based coil;
   determining, by the device and based on the received data, a gap distance between the vehicle-based charging coil and the ground-based charging coil to optimize the transfer of electrical power from the ground-based charging coil to the vehicle-based charging coil when the coils are in charging proximity of one another; and
   sending, by the device, control instructions to an adjustment system to implement the identified gap distance in advance of the determined time by adjusting a height of the vehicle-based charging coil or the ground-based charging coil.

2. The method of claim 1, wherein the adjustment system comprises one or more vehicle suspension controls configured to adjust one or more vehicle suspensions at individual corners of the vehicle.

3. The method of claim 1, wherein the adjustment system comprises one or more controls configured to adjust coil planarity of the vehicle-based coil relative to the ground-based coil.

4. The method of claim 1, wherein the adjustment system comprises position controls configured to adjust a coil height or planarity of the ground-based coil.

5. The method of claim 1, wherein the data regarding the vehicle is received from a cloud-based database of vehicle power transfer efficiencies.

6. The method of claim 1, further comprising:
   monitoring, by the device, transferred energy over time and
   training, by the device, a machine learning model to analyze the monitored transferred energy over time, wherein the control instructions are sent based on the analysis.

7. The method of claim 1, further comprising:
   sending, by the device, control instructions to an adjustment system configured to adjust a height of the ground-based charging coil.

8. An apparatus comprising:
   one or more network interfaces to communicate with a wireless power transfer (WPT) system;
   a processor coupled to the network interfaces and configured to execute one or more processes; and
   a memory configured to store a process executable by the processor, the process when executed configured to:
     receive data regarding a vehicle equipped with a vehicle-based charging coil configured to receive electrical power transferred from a ground-based charging coil of the WPT system;
     determine, based on the received data, a time at which the vehicle-based charging coil is expected to be in charging proximity of the ground-based coil;
     determine, based on the received data, a gap distance between the vehicle-based charging coil and the ground-based charging coil to optimize the transfer of electrical power from the ground-based charging coil to the vehicle-based charging coil when the coils are in charging proximity of one another; and
     send control instructions to an adjustment system to implement the identified gap distance in advance of the determined time by adjusting a height of the vehicle-based charging coil or the ground-based charging coil.

9. The apparatus of claim 8, wherein the adjustment system comprises one or more vehicle suspension controls configured to adjust one or more vehicle suspensions at individual corners of the vehicle.

10. The apparatus of claim 8, wherein the adjustment system comprises one or more controls configured to adjust coil planarity of the vehicle-based coil relative to the ground-based coil.

11. The apparatus of claim 8, wherein the adjustment system comprises position controls configured to adjust a coil height or planarity of the ground-based coil.

12. The apparatus of claim 8, wherein the data regarding the vehicle is received from a cloud-based database of vehicle power transfer efficiencies.

13. The apparatus of claim 8, further comprising:
    monitoring, by the device, transferred energy over time and training, by the device, a machine learning model to analyze the monitored transferred energy over time, wherein the control instructions are sent based on the analysis.

14. The apparatus of claim 8, further comprising:
sending, by the device, control instructions to an adjustment system configured to adjust a height of the ground-based charging coil.

15. A tangible, non-transitory, computer-readable medium storing program instructions that cause a device in a wireless power transfer (WPT) system to perform a process comprising:
receive data regarding a vehicle equipped with a vehicle-based charging coil configured to receive electrical power transferred from a ground-based charging coil of the WPT system;
determine, based on the received data, a time at which the vehicle-based charging coil is expected to be in charging proximity of the ground-based coil;
determine, based on the received data, a gap distance between the vehicle-based charging coil and the ground-based charging coil to optimize the transfer of electrical power from the ground-based charging coil to the vehicle-based charging coil when the coils are in charging proximity of one another; and
send control instructions to an adjustment system to implement the identified gap distance in advance of the determined time by adjusting a height of the vehicle-based charging coil or the ground-based charging coil.

16. The computer-readable medium of claim 15, wherein the adjustment system comprises one or more vehicle suspension controls configured to adjust one or more vehicle suspensions at individual corners of the vehicle.

17. The computer-readable medium of claim 15, wherein the adjustment system comprises one or more controls configured to adjust coil planarity of the vehicle-based coil relative to the ground-based coil.

18. The computer-readable medium of claim 15, wherein the adjustment system comprises position controls configured to adjust coil planarity of the ground-based coil.

19. The computer-readable medium of claim 15, wherein the data regarding the vehicle is received from a cloud-based database of vehicle power transfer efficiencies.

20. The computer-readable medium of claim 15, further comprising:
monitoring, by the device, transferred energy over time and
training, by the device, a machine learning model to analyze the monitored transferred energy over time, wherein the control instructions are sent based on the analysis.

* * * * *